United States Patent [19]
Nagano

[11] 3,983,967
[45] Oct. 5, 1976

[54] CAP FOR AN OPERATING WIRE OF A BICYCLE

[75] Inventor: Masahi Nagano, Sakai, Japan

[73] Assignee: Shimano Industrial Company, Limited, Osaka, Japan JAPAN

[22] Filed: Feb. 10, 1975

[21] Appl. No.: 548,784

[30] Foreign Application Priority Data
Feb. 28, 1974 Japan............... 49-25140[U]

[52] U.S. Cl................... 188/24; 74/489; 74/501 R
[51] Int. Cl.² ................................. B62L 1/00
[58] Field of Search ......... 16/108; 74/501 R, 501 P, 74/488, 489, 558.5; 174/74 A, 87, 135; 188/24

[56] References Cited
FOREIGN PATENTS OR APPLICATIONS
682,312   3/1974   Canada............... 174/87

Primary Examiner—Samuel Scott
Assistant Examiner—Frank H. McKenzie, Jr.
Attorney, Agent, or Firm—Stevens, Davis, Miller & Mosher

[57] ABSTRACT

A cap used for covering an idle end of an operating inner wire for exerting actuators of bicycles such as brakes or the like, which comprises a body, a holder and a retainer thereof. The cap is adapted to allow the body to cover the idle end of the wire to be attached thereto and also the retainer to be fixed to the actuator so that the cap may be retained by the actuator and attached to the wire.

5 Claims, 9 Drawing Figures

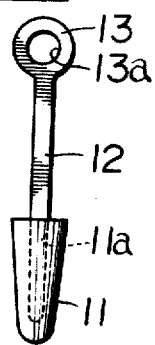
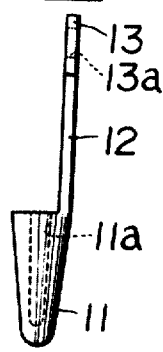
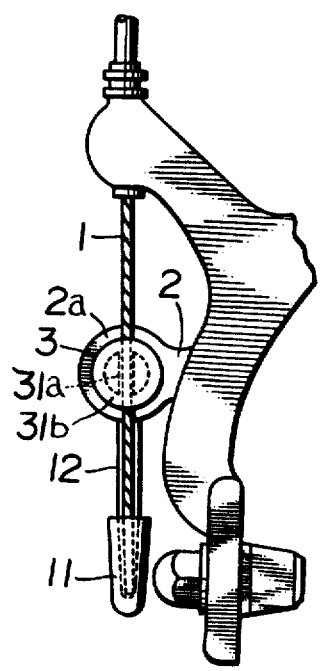
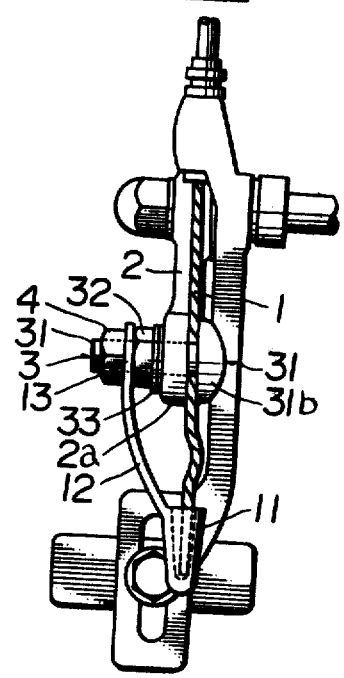

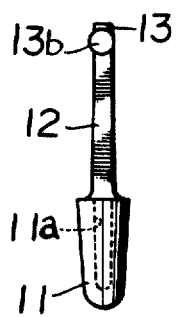
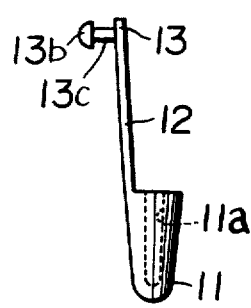
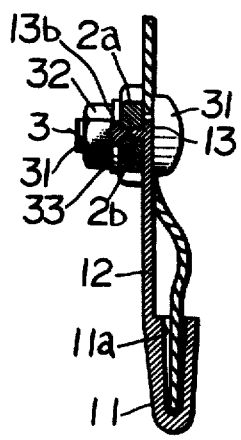
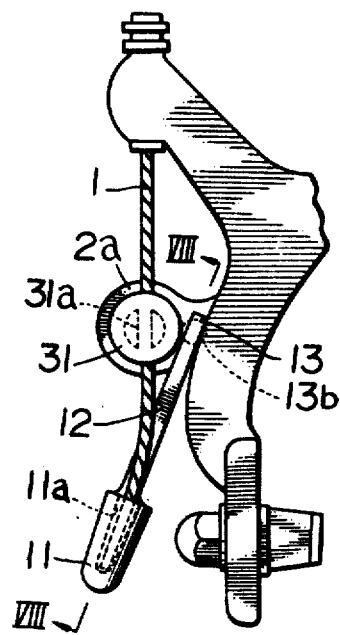

CAP FOR AN OPERATING WIRE OF A BICYCLE

This invention relates to a cap covering an idle end of an operating inner wire (hereinafter referred to as an operating wire) which is employed for brakes or derailleurs of bicycles.

Conventionally, the operating wire is stretched from an operating lever mounted on a bicycle frame to actuators, for example, calliper brakes or derailleurs or the like exerted with the lever, whereby the operating lever acts to pull the operating wire toward the lever side for exerting the actuators.

One end of the operating wire is fixed to the operating lever through a fixed wire end and the other end is fixed to a wire-retainer provided at the actuator. The wire-retainer comprises a round-head screw bolt whose head has a through hole for inserting a wire terminal therethrough and a lock nut screwable with the bolt, whereby the terminal of the operating wire is inserted into the through hole and tightened with the lock nut to be fixed to the wire-retainer.

In this instance, when fixed to the wire-retainer the other end of the operating wire protrudes outwardly of the wire-retainer, which causes a cycler to occasionally have his apparel caught by the idle end or to be injured when coming in contact with the idle end when he takes a ride on a bicycle. Thus, this idle end can be considerably dangerous to the cycler.

Conventionally, while it has been suggested to prevent the cycles from being in danger as aforesaid by means of a cap covering the protruding end of an operating wire, there are such defects in that minute vibrations of the operating wire when the bicycle is in motion make the cap to move minimally resulting in the cap removing itself from the idle end of the wire after a long use, or the cap being removed therefrom when it happens to be hitched to any foreign object in touch therewith. For making the cap hard to be removed from the wire as much as possible, it is necessary to forcibly attach the cap onto the idle end of the wire under a strong pressure, however; since the operating wire is composed of stranded wires for the flexibility thereof and has the idle end of a blush-like section it is most difficult to tightly insert the cap onto the wire end under pressure, and if one tries to do so, much time must be spent in manufacturing the bicycle resulting in a lowering of productivity.

This invention is directed to solve these problems. A main object of the invention is to provide a cap which entirely covers a terminal of an operating wire, namely, a terminal protruding from a wire-retainer so that a cycler will not damage his apparel or injure his hand or fingers in touch with the naked terminal of the wire.

Another object of the invention is to provide a cap which is free from being affected by the wire vibrations and thus from being easily removed from the wire terminal when the bicycle is in motion.

The cap in accordance with the invention is mainly made of synthetic resin, which is characterized in that a body of the cap having a blind hole capable of receiving therein an idle end of the operating wire is provided with a holder of a given length of which one end is formed in a retainer having means in engagement with the wire-retainer at actuators such as brakes or derailleurs.

The abovementioned objects and other objects of the invention will be apparent from the following description in accordance with the accompanying drawings, in which FIG. 1 is a front view showing a cap of an embodiment of the invention, FIG. 2 is a side view thereof, FIG. 3 is a plane view thereof, FIGS. 4 and 5 shown an embodiment of the cap applied to an operating wire for a side-pull system calliper brake of a bicycle, where FIG. 4 is a rear view thereof, FIG. 5 is a side view thereof, FIGS. 6 and 7 show a modified embodiment of FIG. 1, where FIG. 6 is a front view thereof, FIG. 7 is a side view thereof, FIGS. 8 and 9 show an embodiment of the cap in FIGS. 6 and 7 applied to an operating wire for a side-pull system calliper brake, in which FIG. 8 is a rear view thereof, and FIG. 9 is a sectional view taken on Line VIII—VIII in FIG. 8.

Now, an embodiment of the invention applied to an operating wire for a side-pull system calliper brake will be described in the following based on the accompanying drawings.

Referring to the drawings, in FIGS. 4 and 5 the reference numeral 1 denotes an operating wire of which a terminal is fixed with a wire-retainer 3 mounted onto the utmost end 2a of a brake arm 2.

The wire-retainer 3 comprises a round-head locking screw bolt 31 inserted into a bore at the utmost end 2a, a lock nut 32 screwable with the bolt 31 and a washer 33. The round-head bolt 31 is provided with a through bore 31a for inserting the operating wire 1 therein and the wire 1 is inserted at the terminal thereof through the bore 31a. Thereafter, the lock nut 32 is fastened, whereby the wire 1 is sandwiched to be fixed between the round-head 31b of the bolt 31 and the utmost end of the brake arm 2. The fixed terminal of the wire 1 exceeds outwardly of the wire-retainer 3, namely, it projects downwardly thereof as shown in FIGS. 4 and 5.

This invention has been designed to provide a cap for covering an idle end of the operating wire 1 protruding from the wire-retainer 3, which comprises, as shown in FIGS. 1 through 3, a cap body 11, a holder 12 extending along the length of the body 11 and a retainer 13 at the top of the holder 12.

The body 11, holder 12 and retainer 13 are made of synthetic resin, preferably, plastic synthetic resin to be formed integrally with each other. The cap body 11 has at the center a hole 11a receiving the idle end of the wire 1 in a given length thereof and is formed as a whole in a substantially cylinder-like shape.

The hole 11a is opened only at, lengthwise, one end and is closed at the other end thereof so as to be a blind hole. Thus, when inserted into the hole 11a, the idle end of wire 1 is restricted from being further entered thereinto by means of the closed end of the hole 11a, so that the idle end of a given length may be covered with the cap body.

Also, the hole 11a is formed equal to or slightly larger in diameter/than the wire 1. The open end of the hole 11a may be made even larger in diameter so as to make easy the insertion of the wire into the hole 11a.

In addition, the utmost end of the cap body 11, i.e., the closed end of the hole 11a is preferred to be formed in a hemispheric shape as shown in FIGS. 1 and 2.

The holder 12 extended from the body 1 at the opening end of the hole 11a and is formed as a strip relatively narrow and easily flexible. The length of holder 12 is made equal to or slightly smaller, preferably smaller, than the length between the the terminal of the wire 1 and the wire-retainer 3.

Furthermore, the retainer 13 provided at the top of the holder 12 is, as shown in FIGS. 2 and 3, formed in a disc-like shape, and has at the center a bore 13a insertably engageable with the bolt 31 at the wire-retainer 3.

The bore 13a is in engagement with the bolt 31 so that the retainer 13 may be retained thereto, and the cap body 11 can be supported to the bolt by retaining the retainer 13 thereto through the holder 12, thereby making the cap body free from easy removement out of the idle end of the wire 1.

Next, the cap formed as aforesaid is applied to a bicycle in the following manner. Namely the wire-retainer 3 fixes, as shown in FIGS. 4 and 5, the terminal of the wire 1 thereto and the cap body 11 is insertibly attached onto the idle end of the wire protruding out of the wire-retainer 3. Thereafter, the bore 13a at the retainer 13 is inserted onto the bolt 31 at the wire-retainer 3 to be fastened with a nut 4.

Incidentally, the retainer 13 may be fixed to the wire-retainer 3 with the lock nut 32 other than with a nut 4 as aforesaid. In this instance, at first the retainer 13 is placed on to the bolt 31 and adjacent the washer 33, and thereafter, the nut 32 is fastened to fix the retainer 13 together with the wire 1 to the wire-retainer 3. After this fixing of the cap, the body thereof is attached to cover the idle end of the wire 1.

As is clearly understood from the abovementioned description, the cap body 11 is fixed to the wire-retainer and insertably attached to the idle end of the wire 1 by covering the idle end of the wire with the cap body and fixing the retainer 13 to the wire-retainer 3 thereby making the cap free from being affected by vibration so as not to be removed from the wire end when the bicycle is moving.

In addition, the length of the holder 12 is made slightly shorter than that of the uncovered portion of the wire from the bolt 31 to the opening end of the cap body 11 so that the wire 1 is bent as shown in FIG. 5. Thus the cap body 11 is kept in a strained condition due to the effect of restoration of the wire.

In the abovementioned embodiment of the invention, the bore 13a serves as means for engaging the retainer 13 with the bolt 31 at the wire-retainer 3; however, the retainer may, as shown in FIGS. 6 and 7, be formed in a stud-like shape to have a round head 13b so as to be made engageable with a bore 2b formed at the brake arm 2. The bore 2b is made slightly larger in diameter than a stem 13c supporting the round head 13b and is disposed near the wire-retainer 3.

As is apparent from the abovementioned description of the invention, the cap body covering an idle end of the operating wire makes it possible to eliminate defects caused by the protrusion of a naked wire terminal and to make the actuators serve as bicycle parts harmless to a cycler.

Furthermore, the cap body is fixedly supported to bicycle actuators such as brakes or derailleurs by means of the retainer through the holder, whereby the cap of the invention has, differing from a conventional one, the effect of being not removed from the wire even when caught by a foreign object as well as being not removed by itself by minute vibrations of bicycles in long use.

While the representative construction and embodiment of the invention have been described and shown, the invention is not limited to the specific construction shown herewith but is applicable to brakes or derailleurs of bicycles as well as calliper system brakes, and is merely exemplified in the specification rather than defined in the specification.

What is claimed is:

1. A cap for covering an idle end of an operating inner wire for an actuator, such as a brake or derailleur, of a bicycle, said cap comprising:
    a. a cap body of cylindrical shape having a first closed end and an open end, said body including a hole for receiving the inner wire, said hole extending from said open end towards said first closed end and terminating in a second closed end of a hemispheric shape, said hole being slightly larger in diameter than the inner wire and tapering from said open end to said second closed end;
    b. a holder having a given length and extending from one end outwardly from said open end of said cap body, said holder extending in the opposite direction of said hole; and
    c. a retainer provided at the other end of said holder and including means for engagement with the actuator; said cap body, said holder and said retainer being formed integrally with each other and of an elastic material.

2. A cap according to claim 1 wherein the actuator includes a locking screw bolt for locking the inner wire, and said retainer comprises a plate member for engagement with the bolt, said member having a bore at the center of said member, through which the bolt is extendible.

3. A cap according to claim 1 wherein said retainer has a hook like shape.

4. A cap according to claim 2 wherein the length of said holder is shorter than the length of inner wire between the locking screw bolt and said open end.

5. A cap according to claim 1 wherein the actuator has a bore therethrough, and said retainer comprises a stud extending perpendicularly from said holder for insertion in the actuator bore, said stud including a stem connected at one end to said holder and a rounded head supported by said stem at the other end of said stem, said head having a larger diameter than the bore and said stem having a smaller diameter than the bore, whereby said stem may be inserted in the bore and said rounded head may be positioned on a side of the actuator.

* * * * *